(12) United States Patent
Yao et al.

(10) Patent No.: US 7,508,558 B2
(45) Date of Patent: Mar. 24, 2009

(54) COLOR PRINTING

(75) Inventors: Meng Yao, West Linn, OR (US); Trevor J. Snyder, Newberg, OR (US)

(73) Assignee: Xerox Corporation, Norwalk, CT (US)

( * ) Notice: Subject to any disclaimer, the term of this patent is extended or adjusted under 35 U.S.C. 154(b) by 605 days.

(21) Appl. No.: 11/132,747

(22) Filed: May 18, 2005

(65) Prior Publication Data

US 2006/0268295 A1 Nov. 30, 2006

(51) Int. Cl.
- G03F 3/08 (2006.01)
- H04N 1/46 (2006.01)
- G06K 9/00 (2006.01)
- G06K 15/00 (2006.01)

(52) U.S. Cl. .................. 358/523; 358/1.9; 358/518; 358/535; 358/3.06; 382/162; 382/167

(58) Field of Classification Search .................. 358/1.9, 358/518, 3.06, 3.03, 534, 3.23, 3.22, 3.13, 358/523, 535; 382/167, 162
See application file for complete search history.

(56) References Cited

U.S. PATENT DOCUMENTS

| | | | | |
|---|---|---|---|---|
| 5,812,744 A | * | 9/1998 | Allebach et al. | 358/1.9 |
| 6,250,733 B1 | | 6/2001 | Yao et al. | |
| 6,487,308 B1 | * | 11/2002 | Ulichney et al. | 382/162 |
| 6,594,028 B1 | * | 7/2003 | Hamamoto et al. | 358/1.15 |
| 6,650,436 B1 | * | 11/2003 | Hamamoto et al. | 358/1.9 |
| 7,151,618 B2 | * | 12/2006 | Yoshiaki | 358/3.06 |
| 7,199,905 B2 | * | 4/2007 | Sharma | 358/3.04 |
| 2003/0103241 A1 | * | 6/2003 | Sharma | 358/3.06 |
| 2004/0109184 A1 | * | 6/2004 | Ishii | 358/1.9 |
| 2004/0169873 A1 | * | 9/2004 | Nagarajan | 358/1.9 |
| 2004/0184056 A1 | * | 9/2004 | Ikeda | 358/1.9 |
| 2004/0239966 A1 | * | 12/2004 | Larson | 358/1.9 |
| 2005/0030565 A1 | * | 2/2005 | Walmsley et al. | 358/1.9 |
| 2005/0052670 A1 | * | 3/2005 | Nishikawa | 358/1.9 |
| 2005/0052671 A1 | * | 3/2005 | Nishikawa | 358/1.9 |
| 2005/0068554 A1 | * | 3/2005 | Yoshida | 358/1.9 |
| 2006/0061782 A1 | * | 3/2006 | Yao | 358/1.9 |
| 2006/0215189 A1 | * | 9/2006 | Yao | 358/1.9 |
| 2006/0268294 A1 | * | 11/2006 | Snyder et al. | 358/1.9 |
| 2006/0268295 A1 | * | 11/2006 | Yao et al. | 358/1.9 |

* cited by examiner

*Primary Examiner*—Edward L Coles
*Assistant Examiner*—Charlotte M Baker
(74) *Attorney, Agent, or Firm*—Fay Sharpe LLP

(57) ABSTRACT

A method of processing cyan, magenta, and yellow color values C1, M1, Y1 including transforming the C1, M1, Y1 color values to cyan, magenta, and yellow color values C, M, Y in such a manner that each of C, M, Y is not greater than a predetermined maximum value VMAX; obtaining blue, cyan and magenta output color values B, Cout, Mout by setting B=0, Cout=C, and Mout=M; if the sum C+M is greater than VMAX, obtaining blue, cyan and magenta output color values B, Cout, Mout such that B+Cout+Mout=VMAX; and half-toning B, Cout, Mout and Y using a first threshold array A1 for B, Cout and Mout, and a second threshold array A2 for Y.

2 Claims, 4 Drawing Sheets

| 184 | 11  | 224 | 51  | 252 | 17  | 114 | 241 | 128 | 79  | 22  | 140 | 57  | 215 | 160 | 49  |
|-----|-----|-----|-----|-----|-----|-----|-----|-----|-----|-----|-----|-----|-----|-----|-----|
| 236 | 69  | 133 | 107 | 170 | 70  | 196 | 38  | 155 | 191 | 228 | 90  | 185 | 104 | 27  | 86  |
| 115 | 163 | 40  | 209 | 2   | 142 | 96  | 220 | 73  | 119 | 55  | 162 | 13  | 254 | 141 | 208 |
| 8   | 187 | 244 | 81  | 183 | 238 | 29  | 171 | 12  | 246 | 35  | 205 | 126 | 43  | 177 | 61  |
| 145 | 101 | 23  | 154 | 116 | 52  | 137 | 201 | 103 | 147 | 181 | 85  | 230 | 76  | 111 | 239 |
| 44  | 217 | 63  | 229 | 32  | 210 | 92  | 59  | 225 | 66  | 123 | 9   | 151 | 212 | 16  | 194 |
| 82  | 122 | 178 | 132 | 74  | 172 | 253 | 5   | 165 | 42  | 240 | 199 | 98  | 50  | 130 | 159 |
| 30  | 251 | 3   | 202 | 106 | 18  | 143 | 113 | 197 | 138 | 78  | 33  | 175 | 247 | 65  | 222 |
| 169 | 88  | 152 | 46  | 237 | 189 | 67  | 219 | 25  | 105 | 214 | 156 | 121 | 4   | 186 | 109 |
| 203 | 53  | 221 | 124 | 77  | 158 | 39  | 95  | 168 | 245 | 14  | 68  | 233 | 93  | 148 | 20  |
| 97  | 136 | 15  | 176 | 34  | 213 | 135 | 234 | 45  | 87  | 146 | 193 | 37  | 207 | 48  | 243 |
| 60  | 232 | 192 | 94  | 250 | 108 | 0   | 190 | 125 | 206 | 58  | 112 | 164 | 83  | 131 | 179 |
| 1   | 157 | 72  | 26  | 153 | 54  | 166 | 75  | 21  | 161 | 226 | 10  | 255 | 24  | 223 | 117 |
| 91  | 211 | 127 | 235 | 118 | 200 | 227 | 100 | 248 | 47  | 134 | 182 | 99  | 149 | 56  | 195 |
| 249 | 62  | 19  | 180 | 41  | 84  | 28  | 144 | 188 | 110 | 71  | 36  | 204 | 80  | 174 | 31  |
| 102 | 150 | 198 | 89  | 139 | 216 | 173 | 64  | 6   | 218 | 167 | 242 | 120 | 7   | 231 | 129 |

*FIG. 4*

HALF-TONE USING:
IF B > t, C AND M DOTS ARE ON
ELSE IF B+Mout > t, M DOT IS ON
ELSE IF B+Mout+Cout > t,
    C DOT IS ON
IF Y > t', Y DOT IS ON

COLOR PRINTING

BACKGROUND

The subject disclosure is generally directed to color printer half-toning.

Raster type printers, which have been implemented with various print engines such as electrophotographic print engines and ink jet print engines, commonly employ half-toning to transform continuous tone image data to print data that can be printed as an array of dots that can be of substantially similar size. For example, 24 bit/pixel continuous tone image data can be half-toned to a plurality of single color one-bit per pixel bit-maps.

BRIEF DESCRIPTION OF DRAWINGS

FIG. 4 is a schematic diagram of an embodiment of a stochastic threshold value array.

FIG. 5 is a schematic flow diagram of an embodiment of an alternative step that can be employed in the procedure of FIG. 3.

DETAILED DESCRIPTION

Figure 1:
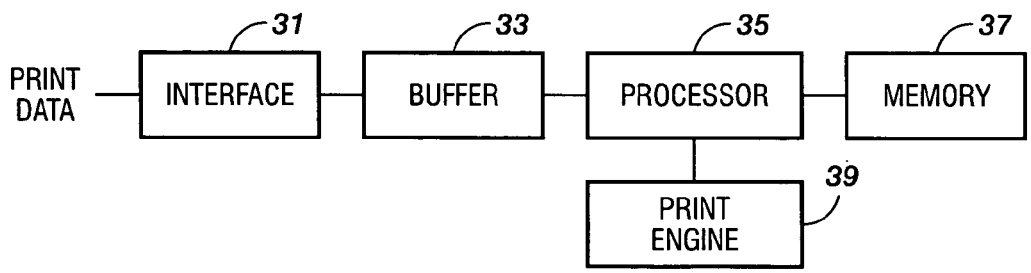
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 2:
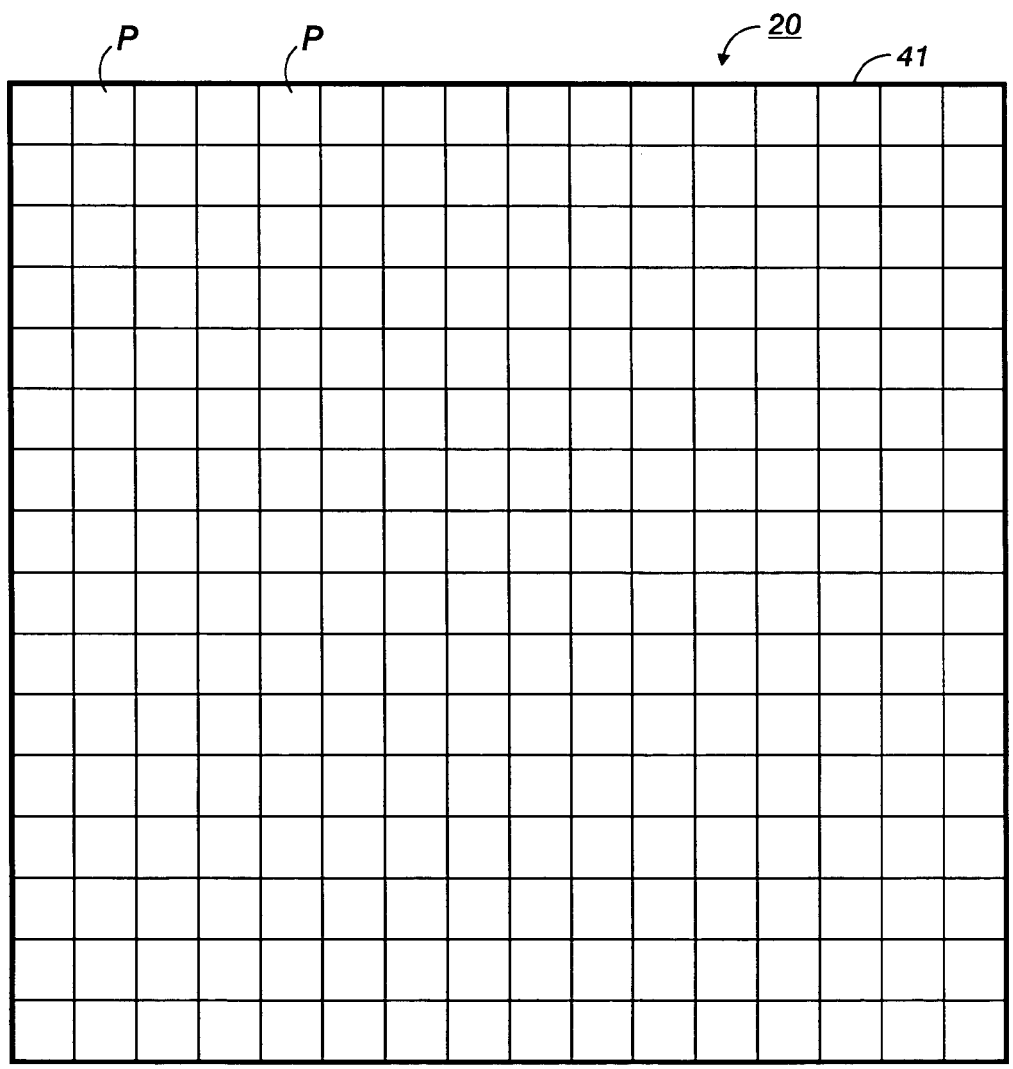
FIG. 2 is a schematic illustration of an embodiment of a pixel array.

FIG. 2 is a schematic illustration of an embodiment of an array 20 of pixel locations P that can be used to define the locations on a print output medium 41 that can be marked or printed. A marking of a particular primary color (e.g., cyan magenta, yellow or black) that is printed or deposited at a pixel location can be conveniently called a dot.

Each pixel location P can, for example, be marked or printed with (a) one or more non-black primary color dots (e.g., cyan, magenta or yellow), (b) a black dot by itself, or (c) a black dot and at least one non-black primary color dot.

Print data typically comprises continuous tone data (such as 32-bit or 24-bit pixel data), and halftoning (e.g., using one or more halftone threshold arrays) is commonly employed to map or transform continuous tone data to a halftoned bit map that contains one bit per pixel per primary color plane, for example.

Figure 3:
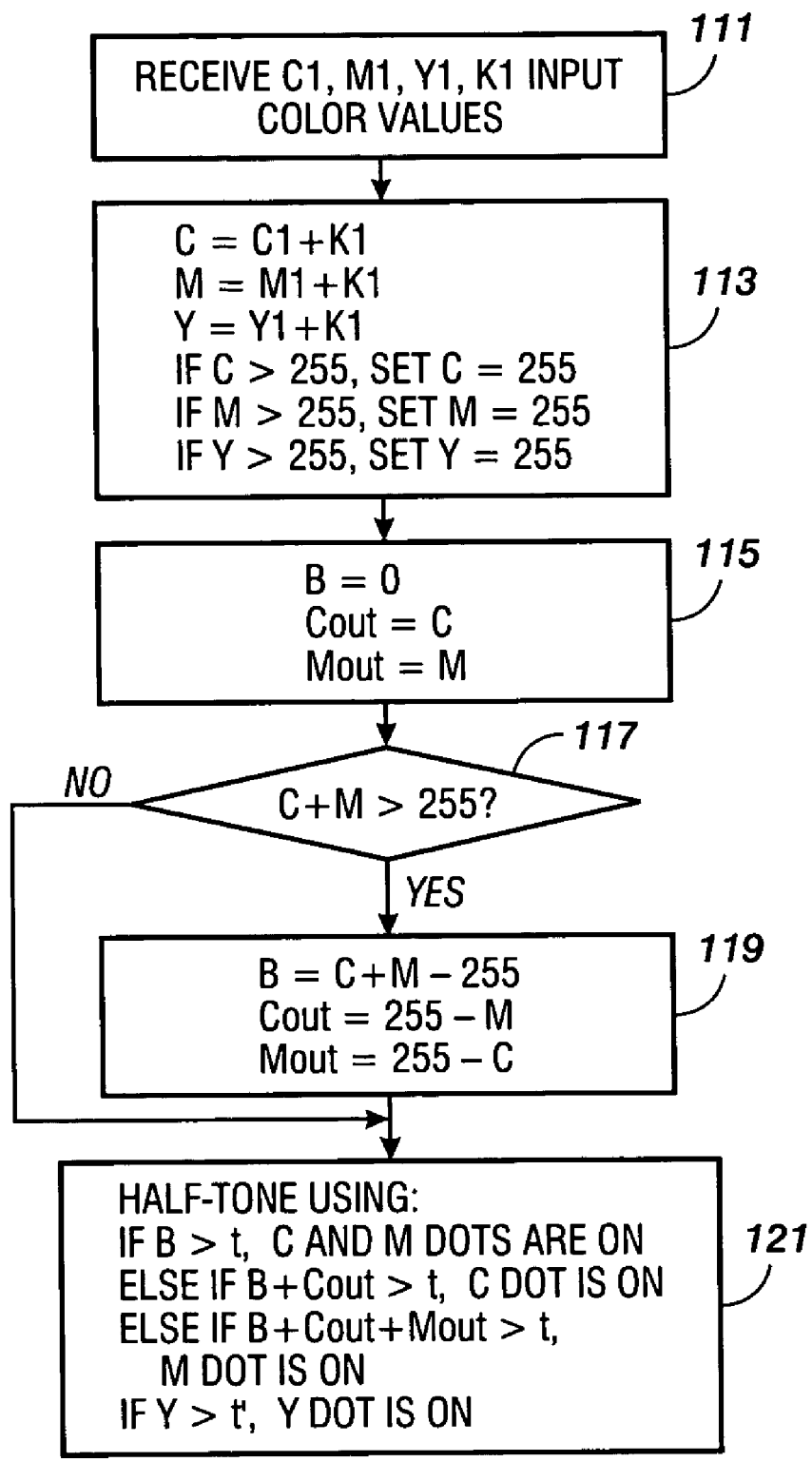
FIG. 3 is a schematic flow diagram of an embodiment of a procedure for printing a pixel of print data.

FIG. 3 is a schematic flow diagram of an embodiment of a procedure for printing a pixel of CMYK print data. At 111 cyan, magenta, yellow, and black input color values C1, M1, Y1, K1 are received. At 113 the input color values C1, M1, Y1, K1 are transformed to cyan, magenta, and yellow color values C, M, Y, for example in such a manner that each of C, M, Y is not greater than a predetermined maximum color value such as 255 (for example for 8-bit color values):

$C = C1 + K1$ $M = M1 + K1$ $Y = Y1 + K1$

If $C > 255$, set $C = 255$

If $M > 255$, set $M = 255$

If $Y > 255$, set $Y = 255$

At 115, a blue color value B for overlapping cyan and magenta is initialized to zero (0), and the cyan and magenta output color values Cout, Mout are initialized to the cyan and magenta values C, M:

$B = 0$ $Cout = C$ $Mout = M$

At 117, a determination is made as to whether C+M is greater than 255. If no, processing continues at 121.

If the determination at 117 is yes, at 119 values for B, Cout, and Mout are calculated, for example such that B+Cout+Mout=255:

$B = C + M - 255$ $Cout = 255 - M$ $Mout = 255 - C$

The equation B+Cout+Mout=255 is based on having no white space since C+M>255. The Equation B=C+M−255 identifies the overlapping cyan and magenta dots as being the amount of C+M that exceeds 255. The foregoing exemplary expressions for Cout and Mout also satisfy the equations C=B+Cout and M=B+Mout, which can provide for printing of the total number of cyan and magenta dots requested by the CMYK color data.

At 121 half-toning is performed using the following, for example using a single stochastic half-tone threshold array A1 having threshold values t scaled to [0, 255] for blue, cyan and magenta, and a stochastic half-tone threshold array A2 having threshold values t' scaled to [0, 255], for the illustrative example wherein the predetermined maximum color value is 255.

| | |
|---|---|
| If B>t, | C, M dots are on |
| Else if B+Cout>t, | C dot is on |
| Else if B+Cout+Mout>t, | M dot is on |
| If Y>t', | dot is on |

FIG. 4 schematically illustrates an embodiment of a stochastic half-tone threshold array that can be employed as either or both of the threshold arrays A1, A2.

The threshold arrays A1, A2 can be correlated or uncorrelated. By way of illustrative example, the threshold array A2 can be derived by shifting the threshold array A1 by a predetermined number of pixels, whereby the threshold array A2 is a replica of the threshold array A1 that is shifted relative to the threshold array A1 by a predetermined number of pixels.

Where A2 is a shifted version of A1, the correlation between A2 and A1 decreases as the shift increases.

FIG. 5 sets forth an embodiment of an alternative half-toning step 121' that can be substituted 121 in the procedure of FIG. 3:

| | |
|---|---|
| If B>t, | C, M dots are on |
| Else if B+Mout>t, | M dot is on |
| Else if B+ Mout+Cout>t, | C dot is on |
| If Y>t', | Y dot is on |

Such half-toning can be performed, for example, using a single stochastic half-tone threshold array A1 having threshold values t scaled to [0, 255] for blue, cyan and magenta, and a stochastic half-tone threshold array A2 having threshold values t' scaled to [0, 255] for yellow, for the illustrative example wherein the predetermined maximum color value is 255. FIG. 4 schematically illustrates an embodiment of a stochastic half-tone threshold array that can be employed as either or both of the threshold arrays A1, A2.

It should be appreciated that the foregoing generally contemplates processing CMY print data, where such data can be transformed from CMYK data. To the extent that the input print data comprises CMY print data, K1 can be omitted from the equations at 113 where the input color values C1, M1, Y1 are transformed to cyan, magenta, and yellow color values C, M, Y, for example in such a manner that each of C, M, Y is not greater than a predetermined maximum color value such as 255 (for example for 8-bit color values).

Pursuant to the disclosed procedures for processing color values, cyan and magenta dots are substantially uniformly distributed, and overlapping cyan and magenta dots are reduced.

In the half-toning step 121', the threshold arrays A1, A2 can be correlated or uncorrelated. By way of illustrative example, the threshold array A2 can be derived by shifting the threshold array A1 by a predetermined number of pixels, whereby the threshold array A2 is a replica of the threshold array A1 that is shifted relative to the threshold array A1 by a predetermined number of pixels. Where A2 is a shifted version of A1, the correlation between A2 and A1 decreases as the shift increases.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer operable method of processing cyan, magenta, and yellow color values C1, M1, Y1, comprising:

receiving input values C1, M1, Y1 through use of input means;

transforming the C1, M1, Y1 color values color values cyan, magenta, and yellow color values C, M, Y in such a manner that each of C, M, Y is not greater than a predetermined maximum value VMAX;

obtaining blue, cyan, and magenta output color values by setting B=0, Cout=C, and Mout=M;

if the sum C+M is greater than VMAX, obtaining blue, cyan and magenta output color values B, Cout, Mout such that B+Cout+Mout=VMAX;

half-toning B, Cout, Mout, and Y using a first threshold array A1 for B, Cout and Mout, and a second threshold array A2 for Y, wherein the second threshold array A2 is a replica of the first threshold array A1, derived by shifting the first threshold array A1 by a predetermined number of pixels in one of a horizontal/vertical, a left/right, or an up/down direction, and wherein the first threshold array A1 and the second threshold array A2 are uncorrelated.

2. A computer operable method of processing cyan, magenta, Yellow and black color values C1, M1, Y1, K1 comprising:

receiving input values C1, M1, Y1, K1 through use of input means;

transforming the C1, M1, Y1, K1 color values to cyan, magenta, and yellow color values C, M, Y through use of the value K1 in such a manner that each of C, M, Y is not greater than a predetermined maximum value VMAX;

obtaining blue, cyan, and magenta output color values by setting B=0, Cout=C, and Mout=M;

if the sum C+M is greater than VMAX, obtaining blue, cyan and magenta output color values B, Cout, Mout such that B+Cout+Mout=VMAX;

half-toning B, Cout, Mout and Y using a first threshold array A1 for Cout and Mout, and a second threshold array A2' for Y, wherein the second threshold array A2 is a replica of the first threshold array A1, derived by shifting the first threshold array A1 by a predetermined number of pixels in one of a horizontal/vertical, a left/right, or an up/down direction, and wherein the first threshold array A1 and the second threshold array A2 are uncorrelated.

* * * * *